US005401010A

United States Patent [19]

[11] Patent Number: 5,401,010

[45] Date of Patent: Mar. 28, 1995

Haswell et al.

[54] MODULAR SYSTEM FOR ASSEMBLY OF WIRING HARNESSES

[76] Inventors: Annette M. Haswell, P.O. Box 156, R.D. No. 2, Furman Mills, Sherburne, N.Y. 13460; Jeffrey L. Carr, R.D. No. 1, Box 72 AJC, Greene, N.Y. 13778

[21] Appl. No.: 250,992

[22] Filed: May 31, 1994

Related U.S. Application Data

[63] Continuation of Ser. No. 76,287, Jun. 11, 1993, abandoned, which is a continuation of Ser. No. 848,751, Mar. 10, 1992, abandoned.

[51] Int. Cl.6 .................................... B23Q 1/04

[52] U.S. Cl. .................................... 269/45; 269/76; 269/299; 269/903; 29/755

[58] Field of Search .................................... 29/755–760, 29/281.1, 281.5; 140/92.1, 93; 269/45, 296–302, 903, 76

[56] References Cited

U.S. PATENT DOCUMENTS

| | | | |
|---|---|---|---|
| 2,774,134 | 12/1956 | Smith et al. | 269/45 |
| 3,633,096 | 1/1972 | Bollman | 29/755 |
| 4,337,934 | 7/1982 | Caveney | 269/903 |
| 4,575,061 | 3/1986 | Dille | 269/45 |
| 4,949,944 | 8/1990 | Groff | 269/45 |

FOREIGN PATENT DOCUMENTS 0376131 7/1990 European Pat. Off. .

*Primary Examiner*—Robert C. Watson

*Attorney, Agent, or Firm*—William E. Zitelli; Carl A. Rankin

[57] ABSTRACT

A modular device for assembling, wiring harnesses, cables and the like includes a number of elongate elements, a number of cable guiding means, each of the cable guiding means being selectively positionable along different points along the length of one of the elongate elements, and a number of securement means for removably securing the elongate elements in a fixed relationship.

9 Claims, 2 Drawing Sheets

MODULAR SYSTEM FOR ASSEMBLY OF WIRING HARNESSES

This is a continuation of application Ser. No. 08/076,287, filed Jun. 11, 1993, now abandoned, which is a continuation of application Ser. No. 07/848,751, filed on Mar. 10, 1992, now abandoned.

FIELD OF THE INVENTION

The present invention relates generally to a method and an apparatus for facilitating the assembly and design of a wiring system, and more particularly, to a method and apparatus enabling the efficient design and repeatable and accurate construction of a complex wiring harness such as for use in an aircraft engine.

BACKGROUND OF THE INVENTION

The design and construction of a cable or wiring harness for use in an aircraft engine or similarly complex application must meet many specific criteria. A typical wiring harness used in an aircraft engine will follow a very complex path around many components of the engine and often will include many locations where smaller groupings of wires split off from the main group to follow complex paths of their own.

Further, design considerations often demand that the tolerances of the individual lengths of a complex wiring harness be on the order of a quarter of an inch or less. In some instances a wiring harness may include a significant number of wires such that the diameters of some of the wire groupings may be two inches or more. A wiring harness which varies slightly from the acceptable tolerances can result in a considerable amount of wasted engine assembly time, since the installation of a wiring harness may require numerous man hours before it is determined that a wiring harness is unacceptable.

Wiring harnesses are constructed on a layout board or unit which provides a guide to assist in sizing the wiring harness. However, the design and construction of the layout board is often very difficult. Usually a prototype engine for which a wiring harness is being constructed is located in a different plant than the layout board, and the size and weight of a conventional layout board makes transportation of the board impractical. Conventionally, a prototype wiring harness is constructed which follows the required path around the engine with the required wiring groups splitting off as necessary. Since it is usually not feasible to send off the prototype wiring harness for use as a model for the construction of a layout board, measurements are made of the prototype wiring harness and the measurements are, in turn, used to construct the layout board. Most often the complexity of the wiring harness and difficulty to accurately measure a large and complex wiring harness requires that several iterations of the layout board design take place until a suitable layout board is completed.

Many conventional layout boards are made of large sheets of plywood with nails used to identify locations where a wiring harness would require a split into certain wire groups. Other wood designs included layout boards with raceways machined into blocks of wood mounted on a plywood sheet. While these machined layout boards are more accurate than the nail design, they are very expensive, take an extremely long time to construct, and are not readily changeable. Still other assembly boards are constructed of sections of extruded aluminum stock which are secured together with arms or branches typically extending off a main trunk to form the appropriate configuration. These aluminum layout boards are very heavy, very expensive, take a long time to build, and are difficult to change, but generally offer accuracy and repeatability in the construction of a wiring harness. Another problem with conventional layout boards is that they are bulky and not easily stored.

It would be desirable to provide a layout board or unit that could be transported unassembled to the site where a prototype engine was being developed and there assembled according to the proper dimensions of the prototype wiring harness. The layout unit could then be transported back to the wiring harness manufacturing facility and reassembled easily, quickly and accurately to the dimensions of the prototype wiring harness so as to minimize the number of design iterations necessary to produce an acceptable wiring harness layout assembly unit design. An additional desire would be to provide a layout kit which could be disassembled and reused for the construction of a different wiring harness once one type of harness had been completed.

SUMMARY OF THE INVENTION

The present invention is directed to a relatively lightweight modular layout unit which can be easily transported and easily and inexpensively modified. The layout unit of the present invention can also be easily dissasembler for storage or for use in constructing a different wiring harness and can be accurately reassembled.

In accordance with one aspect of the invention, a modular device for assembling cables and the like includes a number of elongate elements, a number of cable guides, each of the cable guides being selectively positionable along different points along the length of one of the elongate elements, and a number of securement apparatus for removably securing the elongate elements in a temporarily fixed relationship.

In accordance with another aspect of the invention, a method of assembling a modular wire harness layout unit includes the steps of removably connecting together a number of elongate elements to model the wiring harness, and selectively positioning a number of cable guides at points along the lengths of the elongate elements, the points corresponding to locations where a group of wires of the wiring harness change direction.

In accordance with a further aspect of the invention, a method of assembling a wire harness includes the steps of constructing a modular wire harness layout board, including removably connecting together a number of elongate elements to model the wiring harness, and selectively positioning a number of cable guides at points along the lengths of the elongate elements, said points corresponding to locations where a group of wires of the wiring harness change direction; and, using said layout board as a guide for the assembly of a wiring harness.

To the accomplishment of the foregoing land related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed.

Although the invention is shown and described with respect to certain preferred embodiments, it is obvious that equivalents and modifications will occur to others skilled in the art upon the reading and understanding of the specification. The present invention includes all such equivalents and modifications, and is limited only by the scope of the claims.

DETAILED DESCRIPTION OF THE INVENTION

Figure 1:
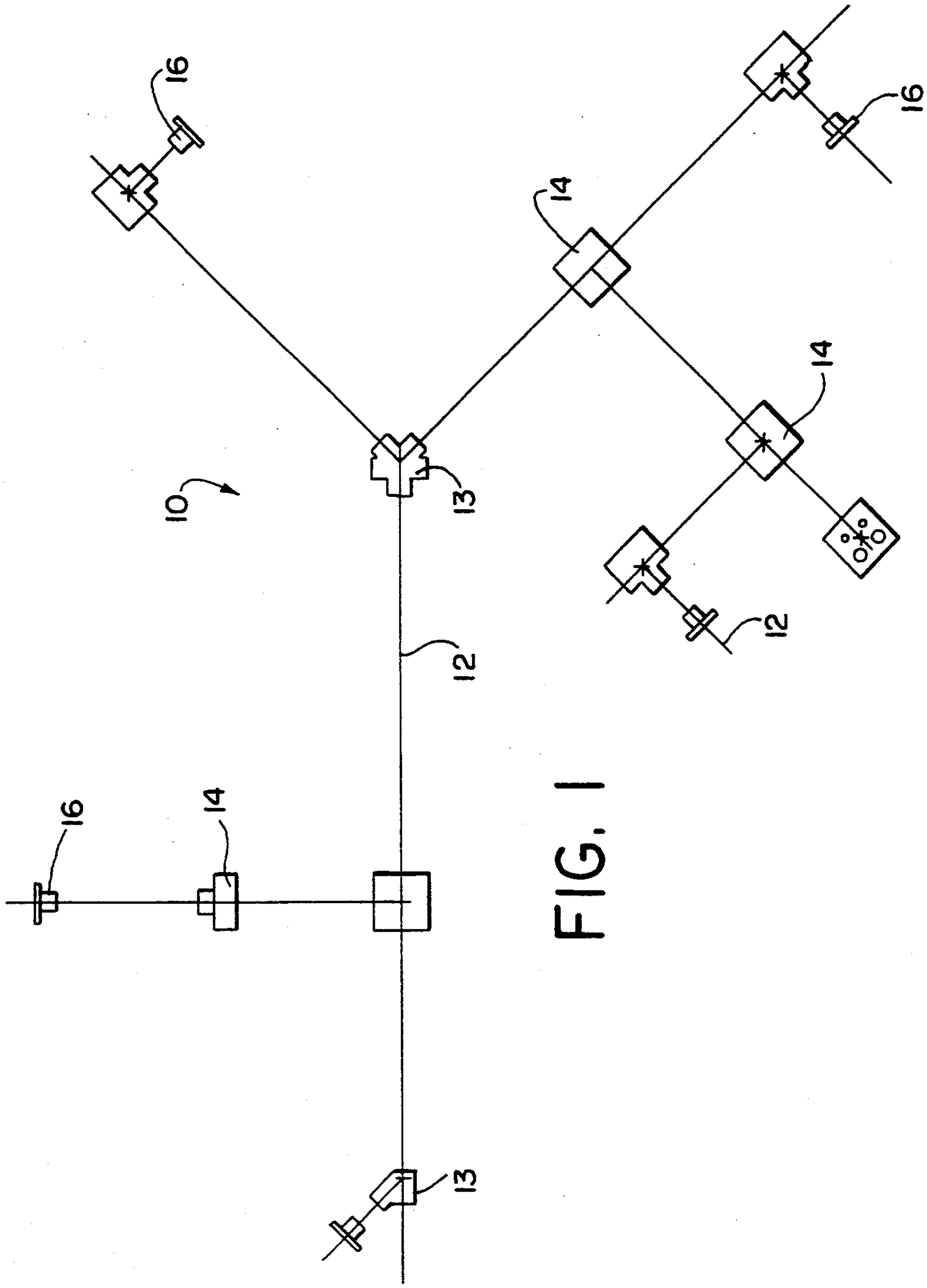
FIG. 1 is a schematic illustration of a modular wiring harness layout unit in accordance with the present invention.

With reference to the several figures in which like reference numeral depict like items, and initially with reference to FIG. 1, there is shown a schematic illustration of a modular layout unit 10 in accordance with the present invention. The modular layout unit 10 includes a number of linear or elongate segments 12 of varying lengths removably joined by segment connectors 13 to form an overall layout of a wiring harness (not shown). While the segments 12 are preferably linear and are described herein as such, in other embodiments the segments may be angled, or curved in other configurations. The linear segments 12 serve to permit spacing of wiring harness guide components 14 along the length of the linear segment so that the wiring harness guide components can be slidably positioned apart the required distance so that a series of wires led by, through, or around the guide components will result in a wiring harness of the desired dimensions. The wiring harness guide components 14 can then be temporarily fixed in the proper position along the linear segments 12. The wiring harness guide components may also serve as connector segments 13 removably securing linear segments 12 in a desired arrangement.

The modular layout board may also include mating connector assemblies 16 simulating the actual connectors on the aircraft engine. The mating connector assemblies 16 are thus located at the required points on the linear segments 12 to place them, relative to the wiring harness, where the actual connectors would appear if the wiring harness was placed on the engine. In some applications, the mating connector assemblies 16 may be electrically connected to test equipment to facilitate checking proper assembly of the wiring harness.

The linear segments 12 are preferably of several different lengths and the connector segments 13 and the wiring harness guide components 14 of several different designs to accommodate different wiring configurations. Typically, the different wiring harness guide components 14 are equipped to accept the end of at least one linear segment 12 or to be temporarily secured to a linear segment at some intermediate point along its length, or to do both. A connector segment 13 typically is adapted to accept ends of separate linear segments 12 to removably secure them at a desired angle.

Similarly, the mating connector assemblies 16 are typically designed to attach to a linear segment 12 at any intermediate point along the length of the linear segment, although a mating connector could be designed to attach to the end of a linear segment. By combining different linear segments 12 of a required length or longer, or by attaching multiple linear segments in series, with different wiring harness guide components 14 and appropriate mating connector assemblies 16, a modular layout unit 10 can be constructed having the required dimensions and configuration.

Figure 2:
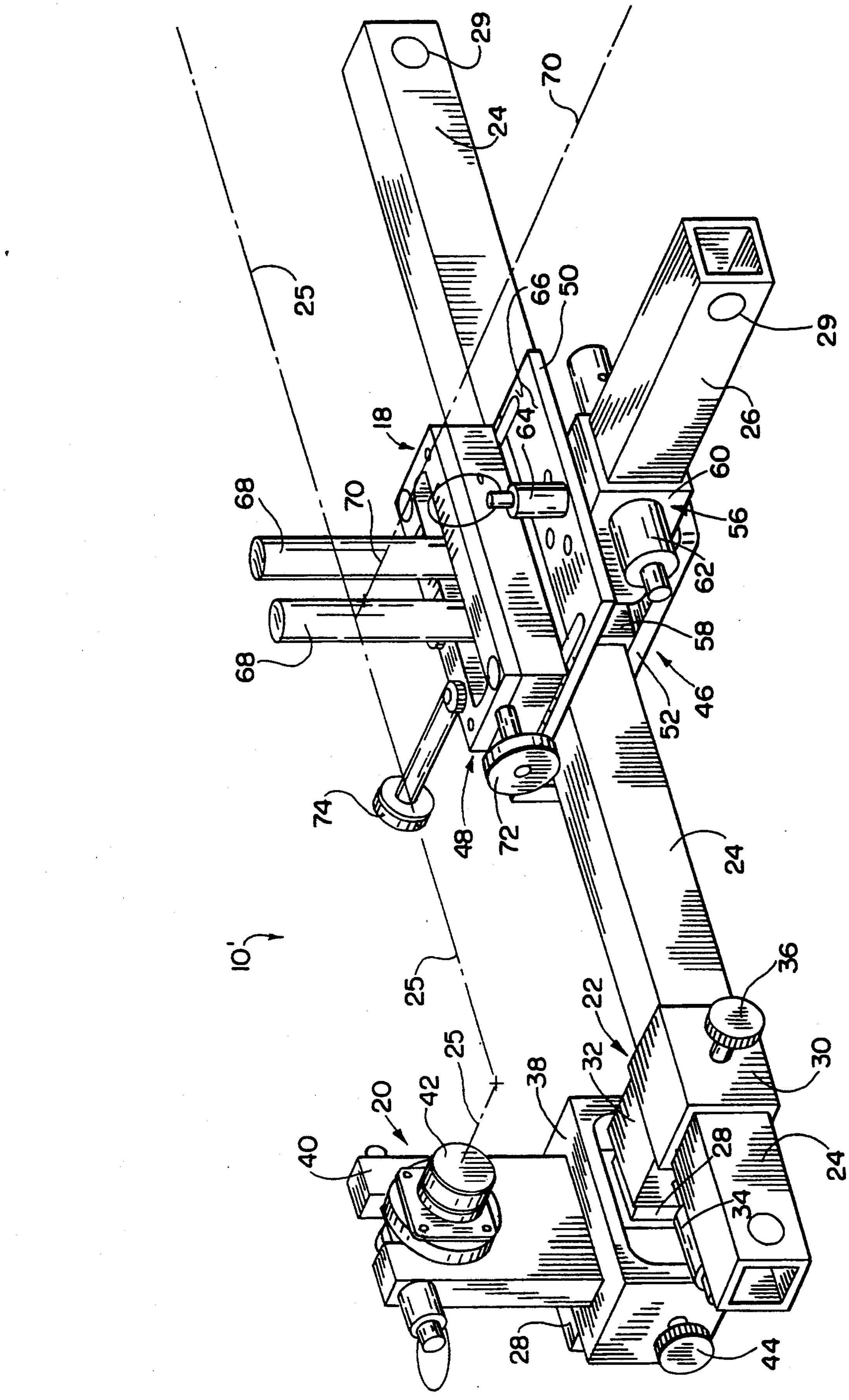
FIG. 2 is an elevation view of exemplary components of a modular wiring harness layout unit.

Referring to FIG. 2, there is shown an exemplary portion of a modular layout unit 10' including a wiring harness guide component 18, a mating connector assembly 20, a segment connector 22 and a number of linear segments 24, 26, and 28. While specific embodiments of the wiring harness guide components, the mating connectors, etc. are shown, it will be appreciated that these are exemplary embodiments of modular elements which may be employed in the assembly of a layout unit. The wiring harness being constructed or modelled is schematically illustrated in FIG. 2 by the line 25.

The linear segments 24, 26, and 28 are preferably hollow extruded aluminum rails having a square cross-section and through holes 29 located near each end. As such the linear segments, or rails, are relatively lightweight, yet strong. To configure the exemplary layout as shown in FIG. 2, rails of three suitable, possibly different, lengths are chosen.

The linear segment 28 is attached to the linear segment 24 by the segment connector 22 which permits a relatively rigid connection between the two segments at a desired angle, in this case a 90° angle. The segment connector 22 includes a pair of preferably square channels 30, 32 having square passages extending at an angle to one another, such as a right angle, permitting the insertion of a linear segment therein. The interior passage of the square channel 32 is closed at the end where it abuts the channel 30 and open at the other end to receive an end of the linear segment 28 which is secured therein through a pin 34 extending through the channel and the through hole 29 in the linear segment 28. The square interior passage of the channel 30 is open at both ends thus permitting slidable movement of the rail connector 22 along the linear segment 24 extending through the interior passage of the channel. An adjustment screw 36 permits the segment connector 22 to be temporarily secured at any point along the length of the linear segment 24 for assembly by tightening of the screw. For disassembly the screw 36 is untightened thus permitting separation of the linear segment 12 and the segment connector 22.

The mating connector assembly 20 includes a base 38 having a square passage and a fork shape element 40 extending upwardly from the base 38 for the securement of a mating connector 42. The linear segment 28 extends through the square passage of the base 38 and an adjustment screw 44 permits the mating connector assembly 20 and, thus, the mating connector 42 to be temporarily secured to the linear segment 28 at the desired location where the wiring cable 25 is to terminate. The mating connector 42 may be rotated within the fork shape dement 40 to accommodate various keyway positions of a connector attached to the cable. This assures an accurate relationship between a connector and the engine component to which it will be secured.

The wiring harness guide component 18 includes a base 46 facilitating removable and adjustable securement to the linear segments 24 and 26, and a guide portion 48 permitting accurate location of a wiring split at a desired angle from the wiring harness. The base 46 includes upper and lower flat plates 50, 52 between which is located a connector element 56 for connecting the wiring harness guide component 18 to one or more linear segments. The connector element 56 may be configured similar to the segment connector 22 with a pair of square channels 58 and 60 each having square passages permitting the insertion of a linear segment therein.

Preferably, the square channel 58 is rigidly attached to the upper and lower plates 50, 52 and permits slidable movement of the wiring harness guide component 18 along the linear segment 24 extending through the interior passage of the channel. An adjustment screw (not shown) permits the wiring harness guide component 18 to be secured at any point along the length of the linear segment 24. The square channel 60 extends outwardly from the wiring harness guide component 18 and is adapted to receive an end of the linear segment 26 which is secured therein through a pin 62 extending through the channel and the through hole 29 in the linear segment 26. Preferably, the channel 60 is pivotally mounted between the upper and lower plates 50, 51, and can be locked by a pin 64 into positions orienting the linear segment 26 orthogonal to the linear segment 24 or at 45 degree angles to the linear segment 24.

The guide portion 48 of the wiring harness guide component 18 is adjustably secured to the upper surface 66 of the upper plate 50 permitting transverse movement of the guide portion relative to the axial extent of the linear segment 24. The guide portion 48 includes a pair of pins 68 defining a location where a set of wires 70 are to be split off from the main wiring cable 25. The space between the pins 68 can be adjusted by the screw 72 to accommodate the diameter of the set of wires 70. Similarly, the diameter of the main wiring cable 25 can be accommodated by moving the guide portion 48, and thus the pins 68, transverse to the linear segment 24 through rotation of the screw 74.

Since individual components can be assembled in almost any possible way, the layout assembly unit can be adapted to model practically any wiring harness configuration. Further, the relatively ease of assembly and disassembly of the layout board and the light weight of the individual components facilitates easy transport of the layout system. Consequently, the individual modular components of the layout unit can be loaded into the back of a van or a car and taken to the site where a prototype engine is being developed. The prototype harness is then removed from the engine so that its configuration and dimensions can be modelled with the modular layout board. The layout unit can then be roughly assembled choosing appropriate rails, cable guide components and mating connector assemblies, such as those exemplary components described herein, to roughly match the prototype wiring harness. The prototype wiring harness is preferably mounted in the layout unit and the individual components are finely adjusted so that the layout board accurately models the prototype wiring harness.

The individual components used to model the wiring harness and the relative dimensions between the components are accurately measured and the layout unit can be disassembled. The same components can then, if desired, be used to assemble a separate layout unit configuration for a different wiring harness. The dissembled components are easily transported back to the location where the wiring harness or harnesses will be built in production. Once the layout unit is reassembled and adjusted according to recorded measurements, it will produce an accurate replica of the wiring harness which it modelled since an actual wiring harness was used. Consequently, not only does the modular layout unit provide a more accurate model of a wiring harness when first reassembled, but it can be reassembled typically in less than an hour as compared to a lead time of often a week for construction of conventional layout boards. The modular layout unit can also be disassembled and easily reused to construct a different wiring harness.

Further, if a dimension is slightly off, or if the wiring harness design changes somewhat, the modular layout unit is easily changed through simple adjustment of the modular components. Since no additional machining is needed, the changes can be implemented very quickly with almost no lead time in restarting production of the modified wiring harnesses.

Another advantage to the modular design of the layout unit of the present invention is that it when a specific wiring harness is no longer being manufactured the layout unit configuration can be recorded and the layout unit disassembler. The components may then be used for other layout unit configurations or stored in a relatively small space until needed again. When a wiring harness of a particular configuration is again needed, the appropriate modular layout unit can be quickly reconstructed using the recorded measurements.

While the foregoing discussion illustrated only a few modular components, for example, the wiring harness guide component and the segment connector, it will be appreciated that these are but examples of several different modular components which can be employed that are within the scope of the modular layout unit of the present invention. Other examples of useful components are a 'Y' shape segment connector allowing a linear segment to split off in two directions, an adjustable segment connector which allows the linear segment to divert at a selected angle, and a many holed plate allowing pins to be inserted at selected locations to facilitate complex cable splitting. All of such examples are with the scope of the present invention.

STATEMENT OF INDUSTRIAL APPLICATION

The modular unit of the present invention is applicable to the assembly of cables and wiring harnesses for use on an aircraft engine, as an example.

What is claimed is:

1. In combination, a modular wire forming and positioning device and a plurality of wires formed into a multi-wire cable assembly by said device such that selected wires are deformed to change direction relative to other wires, to form multi-wire branches at selected locations, said device comprising:

a plurality of interconnecting elongate elements;

a plurality of means for guiding wires of said multi-wire cable along a desired path, each of said guiding means including adjustable coupling means for removably and selectively coupling each of said guiding means to one of said elongate elements at a selected location along the length of said elongate element, said location being where at least a portion of wires are deformed so as to be split off from said other wires, said guiding means further including wire engaging means for use in deforming said wires to be split off to change the direction thereof, said wire engaging means being adjustably adaptable to guide said wire portion to be split off at its respective angle from the multi-wire cable at its respective location, said guiding means being open at the top to permit wires to be laid in place from above and to permit said multi-wire cable assembly to be readily lifted upwardly out of said device without any disassembly of said device, and a plurality of securement means for removably securing said plurality of elongate elements to one another in a temporarily fixed relationship which determines the configuration of said cable assembly.

2. The device of claim 1, wherein said plurality of elongate elements are constructed of extruded aluminum.

3. The device of claim 2, wherein said plurality of elongate elements are rails having a substantially rectangular cross-section.

4. The device of claim 1, wherein at least two of said plurality of elongate elements are of different lengths.

5. The device of claim 1, wherein at least some of said cable guiding means and said securement means are constructed as a single element.

6. The device of claim 1, wherein said guiding means are slidably moveable along a portion of the length of said elongate elements.

7. A modular device for use in assembling cables and the like, comprising:

a plurality of elongate elements;

a plurality of cable guiding means for guiding a cable along a desired path, each of said cable guiding means including coupling means for removably and selectively coupling said cable guiding means to one of said elongate elements at different points along the length of said elongate element, said points corresponding to locations where at least a portion of said cable changes direction or terminates;

a plurality of securement means for removably securing said plurality of elongate elements in a temporarily fixed relationship; and a plurality of cable connector means for providing a mechanical connection with a cable connector on such cable.

8. The device of claim 7, wherein said cable connector means includes means for selectively positioning said cable connector means at a point along one of said elongate elements.

9. A modular wire forming and positioning device for use in making up multi-wire cable assemblies and the like such that selected wires are deformed to change direction relative to other wires, to form multi-wire branches at selected locations, comprising;

a plurality of interconnecting elongate elements;

a plurality of means for guiding wires of a multi-wire cable along a desired path, each of said guiding means including;

adjustable coupling means for removably and selectively coupling each of said guiding means to one of said elongate elements at a selected location along the length of said elongate element, where at least a portion of wires are deformed so as to be split off from said other wires, and a pair of upstanding wire engaging elements adjustable relative to said coupling means for use in deforming and positioning wire portions to be split off from the multi-wire cable at their respective locations, said guiding means being open at the top to permit wires to be laid in place from above and to permit the multi-wire cable assemblies formed in said device to be readily lifted out of said device without any disassembly of said device, and a plurality of securement means for removably securing said plurality of elongate elements to one another in a temporarily fixed relationship which determines the configuration of said cable assembly.

* * * * *